(12) United States Patent
Shin et al.

(10) Patent No.: US 10,479,279 B2
(45) Date of Patent: Nov. 19, 2019

(54) SLIDABLE LUGGAGE BOARD ASSEMBLY FOR VEHICLE

(71) Applicants: Hyundai Motor Company, Seoul (KR); Kia Motors Corporation, Seoul (KR)

(72) Inventors: Han Shin, Seoul (KR); Ji-Ah Kim, Seoul (KR); Jae-Hwan Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 55 days.

(21) Appl. No.: 15/838,864

(22) Filed: Dec. 12, 2017

(65) Prior Publication Data

US 2019/0077319 A1 Mar. 14, 2019

(30) Foreign Application Priority Data

Sep. 8, 2017 (KR) .......................... 10-2017-0115167

(51) Int. Cl.
*B60N 3/00* (2006.01)
*B60R 5/04* (2006.01)

(52) U.S. Cl.
CPC .................................... *B60R 5/045* (2013.01)

(58) Field of Classification Search
CPC ....................................................... B60R 5/045
See application file for complete search history.

(56) References Cited

U.S. PATENT DOCUMENTS

| 6,312,034 | B1* | 11/2001 | Coleman, II | ............ | B60P 1/003 |
| | | | | | 296/26.09 |
| 7,201,418 | B2* | 4/2007 | Bartos | ....................... | B60R 5/04 |
| | | | | | 296/26.01 |
| 8,066,314 | B2* | 11/2011 | Tamura | ...................... | B60R 5/04 |
| | | | | | 296/26.09 |
| 8,840,166 | B1* | 9/2014 | Derbes | .................... | B60R 13/01 |
| | | | | | 224/403 |
| 9,387,891 | B2* | 7/2016 | Richins | .............. | B62D 33/0207 |

FOREIGN PATENT DOCUMENTS

| JP | 2002-87166 A | 3/2002 |
| JP | 2010-105602 A | 5/2010 |
| JP | 5341474 B2 | 8/2013 |
| KR | 10-1231354 B1 | 2/2013 |

* cited by examiner

*Primary Examiner* — Lori L Lyjak
(74) *Attorney, Agent, or Firm* — Mintz Levin Cohn Ferris Glovsky and Popeo, P.C.; Peter F. Corless

(57) ABSTRACT

A slidable luggage board assembly for a vehicle is provided. The slidable luggage board includes a luggage board that is disposed above a floor panel of a cargo area of a vehicle and has an upper surface onto which an article is loaded, and a wheel unit which is disposed on the floor panel and has a wheel that contacts an inner surface of the luggage board when the luggage board is slid. An operation handle is disposed at one side of the luggage board and receives an operating force. A cable has both ends connected to the wheel unit and the operation handle and transmits operating force applied to the operation handle to the wheel unit.

17 Claims, 19 Drawing Sheets

RELATED ART

RELATED ART

RELATED ART

RELATED ART

SLIDABLE LUGGAGE BOARD ASSEMBLY FOR VEHICLE

CROSS-REFERENCE TO RELATED APPLICATIONS

This application claims priority to Korean Patent Application No. 10-2017-0115167, filed on Sep. 8, 2017, which is incorporated herein by reference in its entirety.

BACKGROUND

Field of the Disclosure

The present disclosure relates to a luggage board assembly disposed in a cargo area of a vehicle and onto which articles are loaded, and more particularly, to a slidable luggage board assembly for a vehicle which may be tilted without exposing a rail.

Description of Related Art

Recently, consumer demand for convenience equipment for a cargo area of a vehicle has increased in accordance with an increase in leisure activities and a change in consumer purchasing trends. To address the consumer demand, a technology that allows an occupant to slide a luggage board has increasingly been applied to vehicles.

As illustrated in FIG. 1, rails 111 are disposed in a longitudinal direction of a vehicle in a cargo area of the vehicle, and a luggage board is slid along the rails 111 to allow more easy loading or unloading of articles. A luggage board assembly in the related art includes the rails disposed in the longitudinal direction of the vehicle on a floor panel 110 in a cargo area room of the vehicle, and a luggage board 120 disposed above the floor panel 110. As illustrated in FIGS. 2 to 5, a runner 130 is disposed on a bottom surface of the luggage board 120 to be parallel to the rails 111, and wheels 132 are disposed on the runner 130 to move along the rails 111, to slide the luggage board 120 above the floor panel 110.

As illustrated in FIG. 4, a part of the wheel 132 is inserted into the rail 111 (see FIG. 4), and a guide 131, which protrudes from a bottom surface of the runner 130, is inserted into the rail 111 (see FIG. 5) to guide the luggage board 120 to displace the luggage board 120 in the longitudinal direction of the vehicle. In addition, a locker 133 is disposed on the runner 130 to maintain the luggage board 120 at a predetermined position. The locker 133 is connected, through a cable 150, to an operation handle 140 disposed on the luggage board 120. Accordingly, the occupant may extend the luggage board 120 when the luggage board 120 is slidable as the locker 133 is separated from a locking groove (not illustrated) formed in the rail 111 when the occupant operates the operation handle 140. When the luggage board 120 is returned back to an initial position, the locker 133 is inserted into the locking groove, thereby allowing the luggage board 120 to remain disposed at a predetermined position.

However, according to the luggage board assembly in the related art as described above, the rail 111 into which the wheel 132 and the guide 131 are inserted is disposed on the floor panel 110. Accordingly, space is required to install the rail 111, and thus, space in the cargo area is reduced. In particular, since the rail 111 is exposed to the outside, marketability related to an external appearance deteriorates, and foreign substances enter the rail 111, which causes a deterioration of the rail components. Further, the luggage board 120 may be slid only in parallel with the floor panel 110, but the luggage board 120 does not tilt relative to the floor panel 110. Accordingly, the user is inconvenienced when extending out or retracting the luggage board 120.

The above information disclosed in this section is merely for enhancement of understanding of the background of the disclosure and therefore it may contain information that does not form the prior art that is already known in this country to a person of ordinary skill in the art.

SUMMARY

The present disclosure provides a slidable luggage board assembly for a vehicle that allows an article to be more easily loaded or unloaded by allowing a luggage board to be extended or retracted without exposing a rail. Additionally, a slidable luggage board assembly for a vehicle may be extended retracted when the slidable luggage board assembly for a vehicle is tilted when loading or unloading an article.

In an aspect of an exemplary embodiment of the present disclosure, a slidable luggage board assembly for a vehicle may include a luggage board disposed above a floor panel of a cargo area of a vehicle and may have an upper surface onto which an article is loaded, a wheel unit disposed on the floor panel and has a wheel that contacts an inner surface of the luggage board when the luggage board is slid, an operation handle disposed at one side of the luggage board and receives operating force and a cable having a first end connected to the wheel unit and a second end connected to the operation handle and transmits the operating force input to the operation handle to the wheel unit.

In some exemplary embodiments, bent portions bent in a downward direction may be formed at both ends of the luggage board. The bent portion may be formed in a longitudinal direction of the vehicle, a rail having a concave cross section and comes into contact with the wheel when the wheel unit is operated, may be disposed in the bent portion. The wheel may be inserted into the rail when the operation handle is operated and may guide the sliding movement of the luggage board.

In other exemplary embodiments, the wheel unit may include a wheel bracket coupled in an accommodating groove concavely formed in the floor panel, a wheel support which is rotatably disposed in the wheel bracket and has a lower end connected to an end portion of the cable and a wheel which is rotatably disposed at an upper end of the wheel support, and the upper end of the wheel support may be configured to rotate to be proximate to the rail. The wheel may be inserted into the rail when operating force is transmitted to the lower end of the wheel support through the cable. The wheel may be disposed to displace the rail in an upward direction by a predetermined height when the wheel is rotated and inserted into the rail.

A rotating shaft may be disposed to penetrate the wheel bracket and the wheel support. The rotating shaft may be disposed in the longitudinal direction of the vehicle and the wheel may be rotated in a width direction of the vehicle and inserted into the rail. A lower fixing unit may support a lower end of the wheel and may be coupled to the wheel support, may be disposed between the upper end of the wheel support and the wheel.

An accommodation cavity for accommodating the lower fixing unit may be formed at the upper end of the wheel support. A lower portion of the lower fixing unit may be disposed in the accommodation cavity. The lower fixing unit may be formed in the form of a disc and may have an insertion portion that protrudes in a downward direction from a bottom surface of the lower fixing unit, and the insertion portion may be disposed in the accommodation cavity. A fixing pin may be disposed to penetrate an upper portion of the wheel support and the insertion portion. The fixing pin may be disposed in the width direction of the vehicle.

A side surface of the insertion portion may be a flat surface which is in surface-to-surface contact with a side surface of the wheel support in the accommodation cavity. An upper cap may be disposed to penetrate the wheel, and a lower end of the upper cap may be coupled to the lower fixing unit. The rails may be disposed at both ends of the luggage board, and the wheel units may be disposed at both ends of the floor panel, respectively.

The operation handle may include an operating portion which is exposed from the upper surface of the luggage board and may be grasped by the occupant; a rotating portion may be integrally formed with the operating portion and rotatably disposed in the luggage board, a link operating portion may extend from an end portion of the rotating portion and a cooperating lever may include a first end that is rotatably disposed on the luggage board and rotated by coming into contact with the link operating portion when the link operating portion is rotated, and a second end that is connected to the cable. The operating portion, the rotating portion, and the link operating portion may be integrally formed.

An extension portion, which extends from the link operating portion toward the cooperating lever may be formed at a front end of the link operating portion, and an inclined surface, that may be inclinedly in contact with an edge of the cooperating lever below the cooperating lever and may be formed at the front end of the link operating portion. A wheel unit restoring component, that returns the wheel unit rotated by the cable to an original position, may be disposed in the floor panel. The wheel unit restoring component may include a spring housing coupled to the floor panel and formed in a tubular shape, a restoring spring which is inserted into the spring housing and elastically supports the wheel unit and a contactor disposed at a front end of the restoring spring and contacts a side surface of the wheel support.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
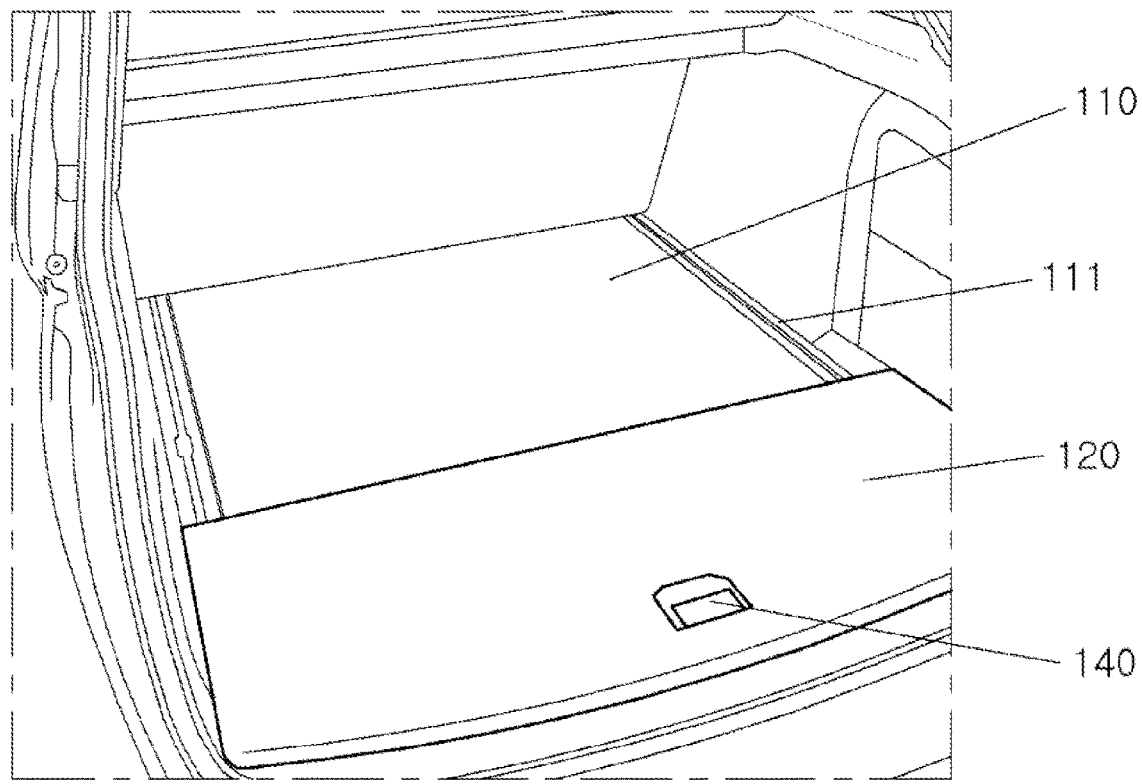
FIG. 1 is an exemplary perspective view illustrating a luggage board assembly for a vehicle in the related art.
Figure 2:
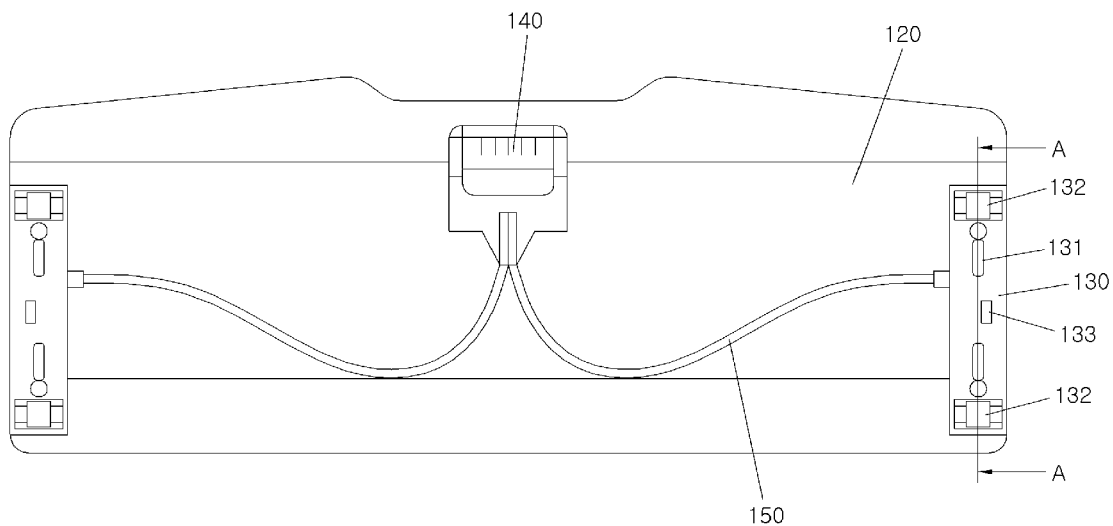
FIG. 2 is an exemplary bottom plan view illustrating the luggage board assembly for a vehicle in the related art.
Figure 3:
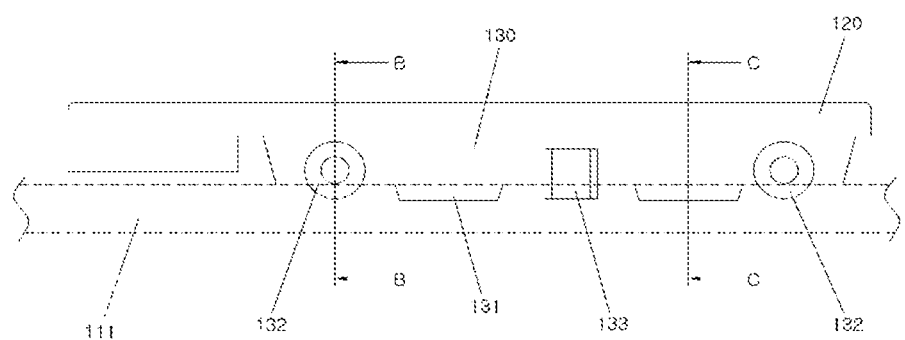
FIG. 3 is an exemplary cross-sectional view taken along line A-A of FIG. 2 for a vehicle in the related art.
Figure 4:
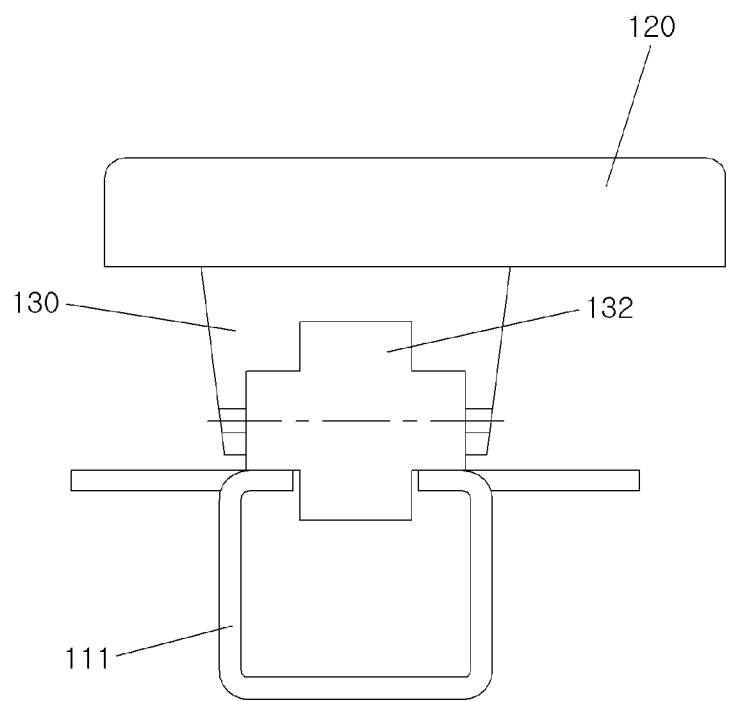
FIG. 4 is an exemplary cross-sectional view taken along line B-B of FIG. 3 for a vehicle in the related art.
Figure 5:
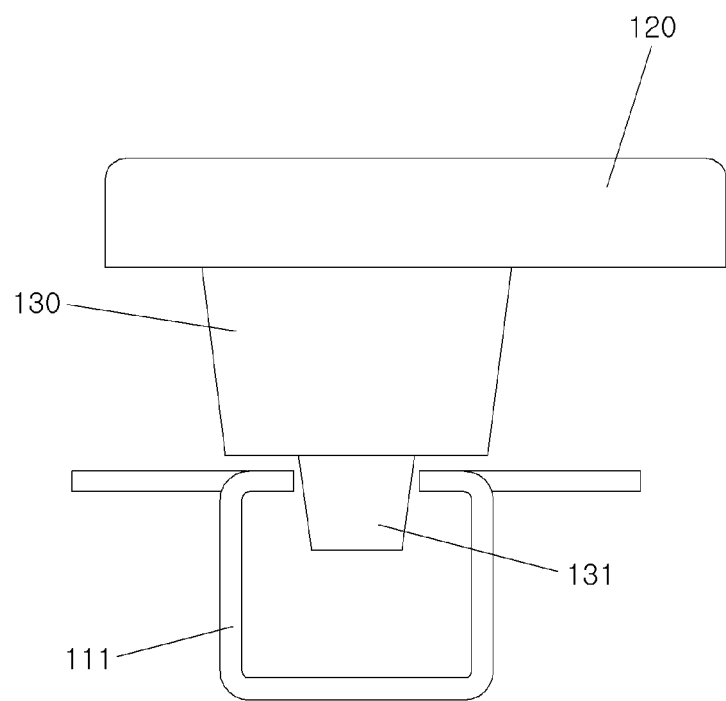
FIG. 5 is an exemplary cross-sectional view taken along line C-C of FIG. 3 for a vehicle in the related art.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a slidable luggage board assembly for a vehicle according to the present disclosure will be described in detail with reference to the accompanying drawings. The slidable luggage board assembly for a vehicle according to the present disclosure may include a luggage board 20 disposed above a floor panel 10 of a cargo area of a vehicle and has an upper surface onto which an article is loaded, wheel units 30 disposed on the floor panel 10 and have wheels 34 that contact an inner surfaces of the luggage board 20 when the luggage board 20 is slid, an operation handle 40 disposed at one side of the luggage board 20 and receives operating force, and cables 50 which are connected, at a first end to the wheel units 30 and at a second end to the operation handle 40 and transmit the operating force applied to the operation handle 40 to the wheel units 30.

The luggage board 20 may be disposed on an upper surface of the floor panel 10 that forms a bottom surface of the cargo area of the vehicle. The upper surface of the luggage board 20 may be formed as a flat surface to enable an article to be loaded onto the upper surface of the luggage board 20. Bent portions 20a, which are bent in a downward direction from both ends of the luggage board 20 may be formed at both ends of the luggage board 20. The luggage board 20 may be spaced apart from the floor panel 10 at an interval corresponding to a height of the bent portion 20a, and the wheel unit 30 to be described below may be disposed between the luggage board 20 and the floor panel 10.

Rails 21 may be formed on inner surfaces of the bent portions 20a of the luggage board 20 in a longitudinal direction (e.g., T direction) of the vehicle. The rail 21 may have a concave cross section, to enable the wheel 34 of the wheel unit 30 to be inserted into the rail 21 when the luggage board 20 is slid, thereby allowing the luggage board 20 to slide more smoothly. When the wheel 34 is inserted into the rail 21, the cross section of the rail 21 surrounds a circumference of the wheel 34 to support the rail 21 by the wheel 34, thereby allowing the luggage board 20 to slide more easily (see FIG. 11C).

Figure 6:
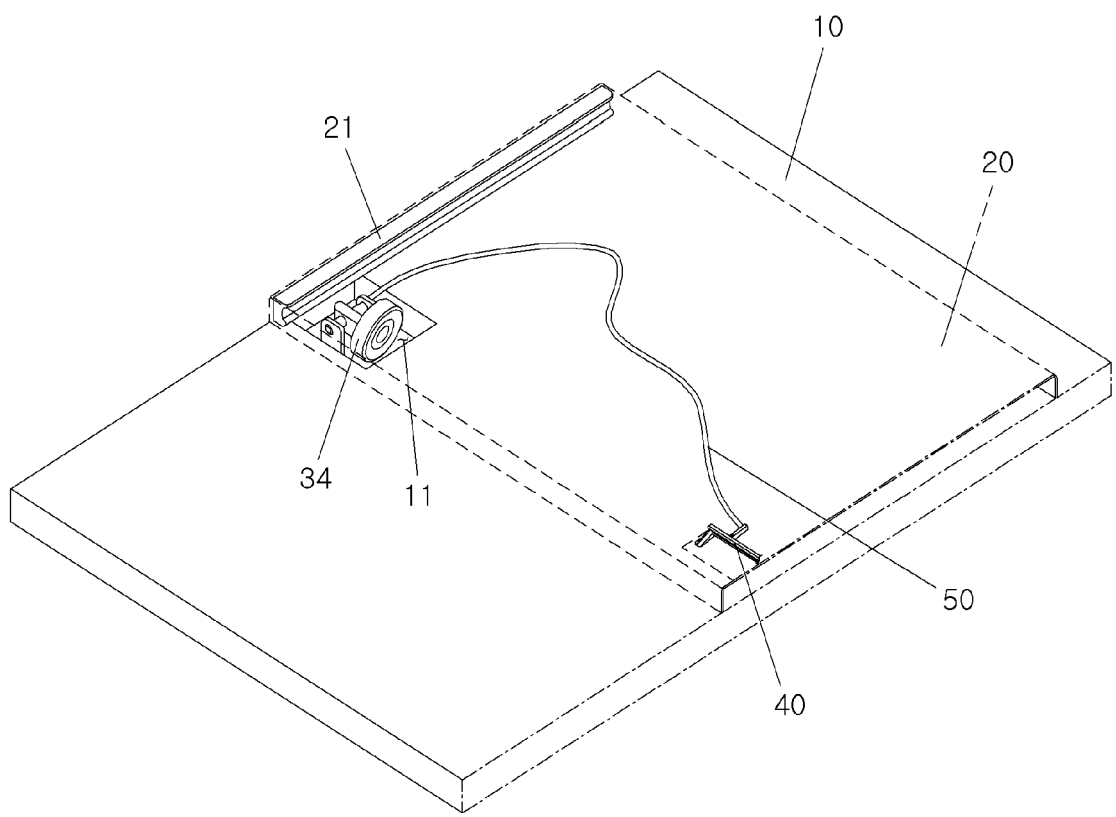
FIG. 6 is an exemplary perspective view illustrating a slidable luggage board assembly for a vehicle according an exemplary embodiment of the present disclosure.
Figure 7:
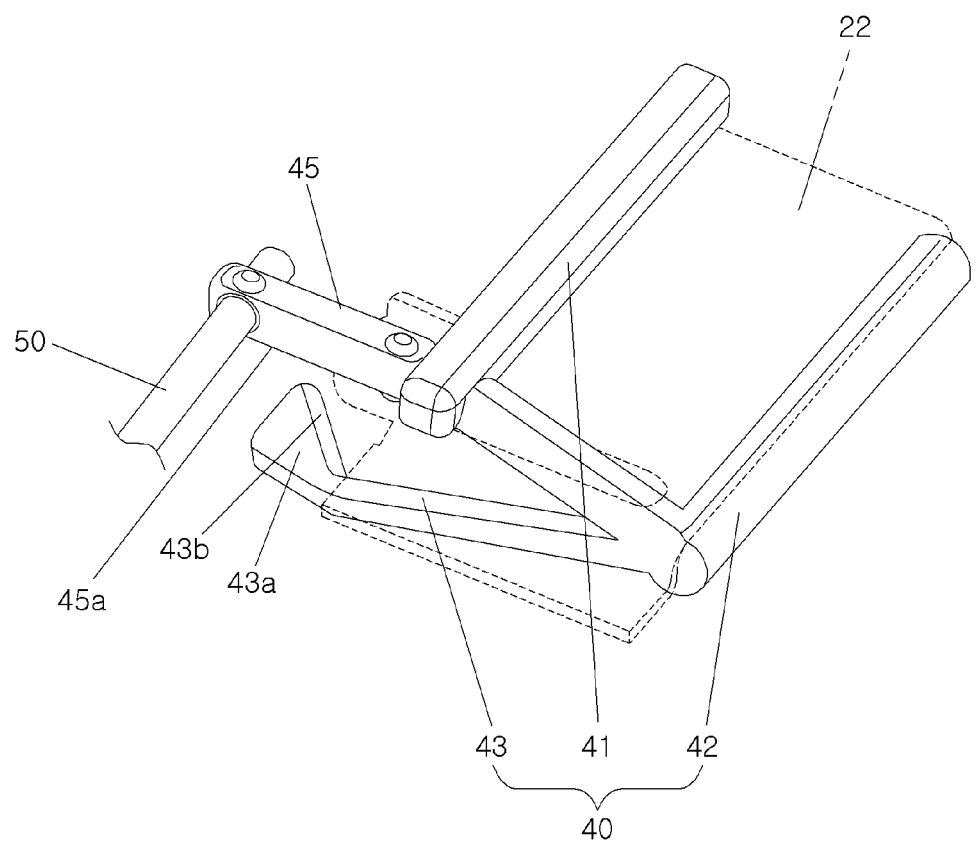
FIG. 7 is an exemplary perspective view illustrating an operating portion of the slidable luggage board assembly for a vehicle according to an exemplary embodiment of the present disclosure.
Figure 8:
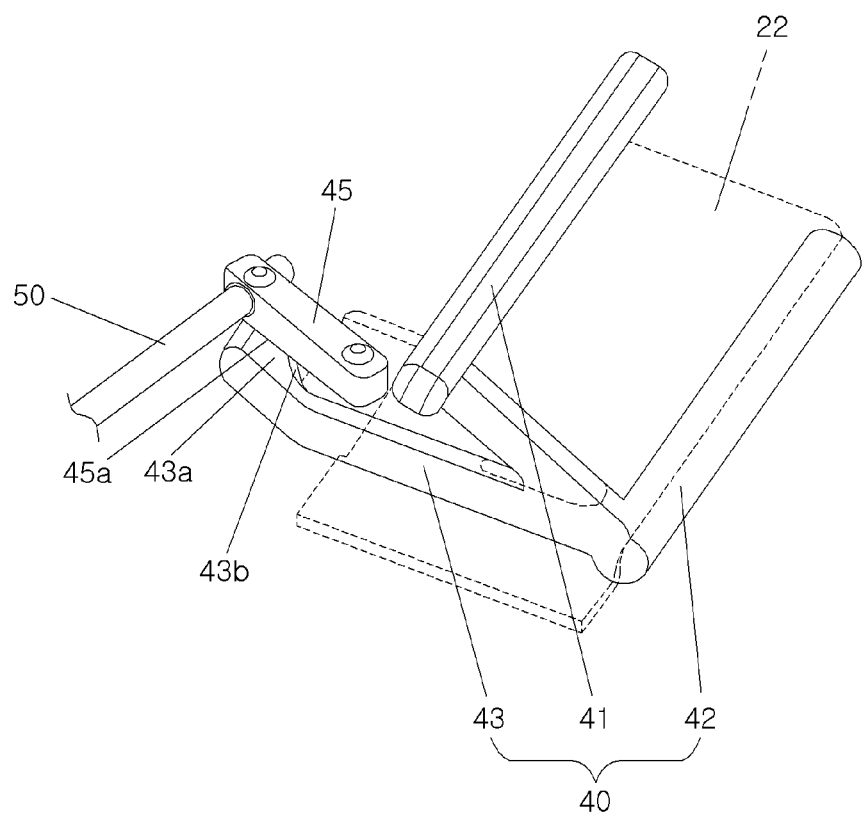
FIG. 8 is an exemplary perspective view illustrating a state in which the operating portion of the slidable luggage board assembly for a vehicle according to an exemplary embodiment of the present disclosure.

FIG. 6 illustrates a left half of the cargo area of the vehicle, but the same configuration applies to a right half, and the wheel unit 30 may also be disposed at a right end. The wheel unit 30 may be disposed on the floor panel 10 to dispose the wheel unit 30 to contact the luggage board 20 when the luggage board 20 slides, and the wheel unit 30 is spaced apart from the luggage board 20 when the luggage board 20 remains in a stationary position. The wheel unit 30 may include the wheel 34 which contact the inner surface of the luggage board 20, for example, the rail 21 disposed on the inner surface of the bent portion 20a of the luggage board 20 when the luggage board 20 slides, and the wheel unit 30 may also include elements for installing the wheel 34.

The wheel 34 may be positioned in parallel with the ground surface (e.g., a rotation axis is perpendicular to the ground surface) to enable the wheel 34 to contact the rail 21 when the luggage board 20 slides, and the wheel 34 is positioned to be perpendicular to the ground surface (e.g., the rotation axis is parallel to the ground surface) when the luggage board 20 remains stationary. A wheel bracket 31 may be coupled to a bottom surface of an accommodating groove 11 of the floor panel 10. A wheel support 32 that supports the wheel 34 may be disposed in the wheel bracket 31. The wheel bracket 31 may be formed in a U shape to ensure a space in which the wheel support 32 may be rotated, and the wheel bracket 31 may be coupled to the floor panel 10.

The wheel support 32 may be rotatably disposed in the wheel bracket 31. The wheel 34 may be disposed on an upper portion of the wheel support 32, the cable 50 to be described below may be connected to a lower portion of the wheel support 32, and an intermediate portion of the wheel support 32 may be rotatably disposed on the wheel bracket 31. The wheel support 32 may be rotatably disposed in the wheel bracket 31 by the wheel bracket 31 and a rotating shaft 33 that penetrates the wheel support 32. The rotating shaft 33 may be disposed in the longitudinal direction (e.g., T direction) of the vehicle, in other words in a direction that the luggage board 20 slides. Therefore, upper and lower ends of the wheel support 32 may be rotated in a width direction (e.g., L direction) of the vehicle. The wheel support 32 may be perpendicular to the ground surface when the luggage board 20 slides, and the wheel support 32 is parallel to the ground surface when the luggage board 20 remains stationary. An accommodation cavity for a lower fixing unit 35 may be formed at an upper end of the wheel support 32, and contact surfaces 32a, which are flat surfaces may be formed at both sides of the space.

The lower fixing unit 35 may be rotatably disposed at the upper end of the wheel support 32. A part of the lower fixing unit 35 may be inserted into the cavity formed at the upper end of the wheel support 32, and a fixing pin 36 may simultaneously penetrates the upper end of the wheel support 32 and the lower fixing unit 35. Accordingly, the lower fixing unit 35 may be rotated about the fixing pin 36. The fixing pin 36 may be disposed in a direction perpendicular to the rotating shaft 33 in the width direction (e.g., L direction) of the vehicle, thereby allowing the lower fixing unit 35 to be rotated in the longitudinal direction (e.g., T direction) of the vehicle. Accordingly, the luggage board 20 may tilt when the luggage board 20 is slid in an inclined direction.

The lower fixing unit 35 may be formed in a disc shape to support the wheel 34. A lower portion of the lower fixing unit 35 may include an insertion portion 35a that may be inserted into the cavity formed at the upper end of the wheel support 32. The insertion portion 35a may be formed in a rounded shape, and side surfaces of the insertion portion 35a may include contact surfaces 35b which are in surface-to-surface contact with the contact surfaces 32a of the wheel support 32. The wheel support 32 and the lower fixing unit 35 may be in surface-to-surface contact with each other through the contact surfaces 32a and 35b. The wheel support 32 and the lower fixing unit 35 may be connected to each other by the fixing pin 36. The wheel 34 may be rotated in the T direction without moving in the L direction when the luggage board 20 slides in the inclined state. When the wheel 34 is seated on the lower fixing unit 35, the wheel 34 may be rotatably disposed by an upper cap 37 that penetrates the wheel 34 and may be coupled to the lower fixing unit 35.

A wheel unit restoring component may enable the wheel unit 30 to return to an original position when the wheel unit 30 does not support the luggage board 20. In other words, the wheel unit 30 supports the luggage board 20 when the luggage board 20 slides, when the luggage board 20 maintains a stationary position, the wheel unit 30 may be inserted into the accommodating groove 11 and spaced apart from the luggage board 20. The wheel unit restoring component may enable the wheel unit 30 to return to the original position by using elastic force, and the wheel unit restoring component provides elastic force in a direction in which the wheel unit 30 is inserted into the accommodating groove 11. Accordingly, the wheel unit 30 may be spaced apart from the luggage board 20 when the luggage board 20 maintains a stationary position.

Figure 9:
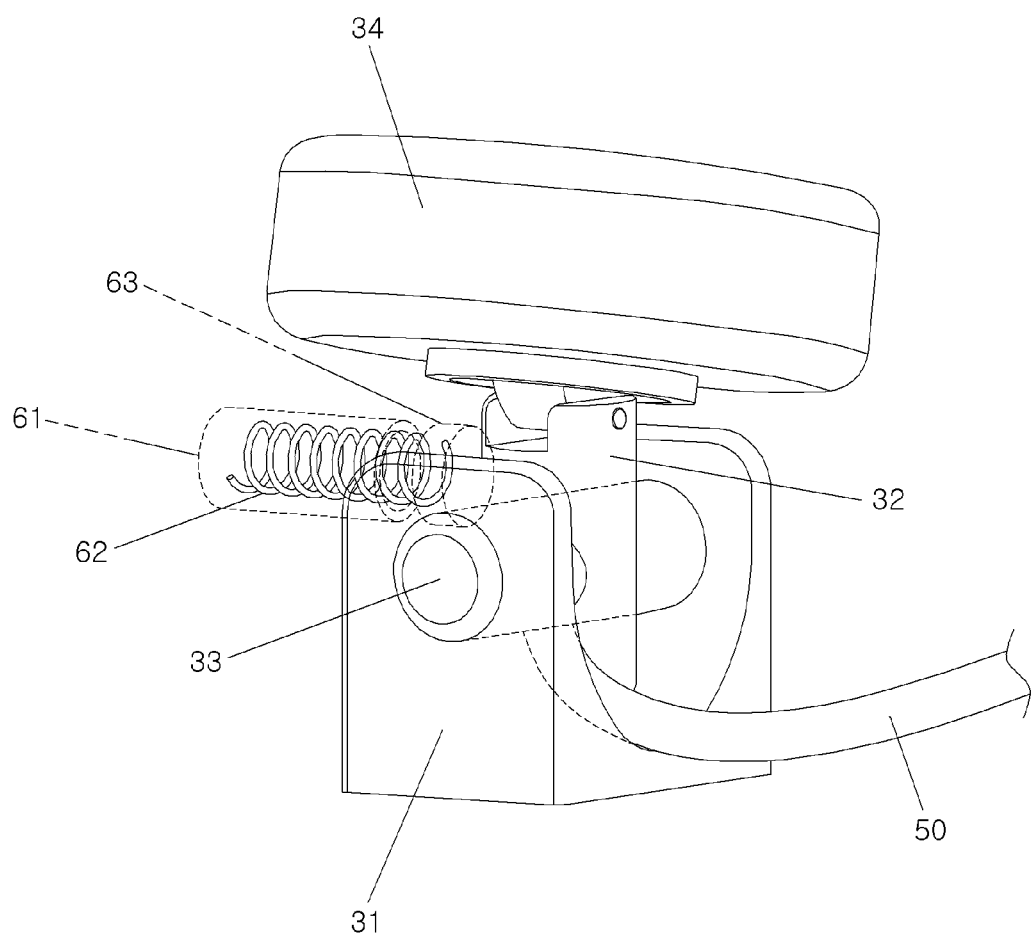
FIG. 9 is an exemplary perspective view illustrating a wheel unit of the slidable luggage board assembly for a vehicle according to an exemplary embodiment of the present disclosure.
Figure 10:
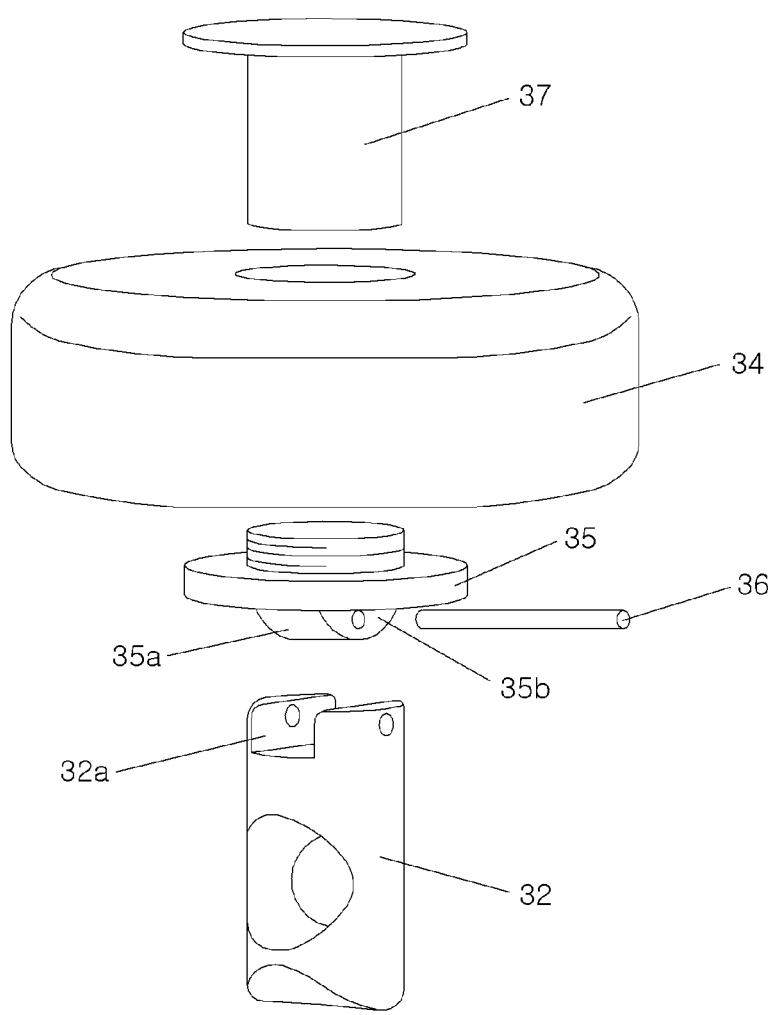
FIG. 10 is an exemplary exploded perspective view illustrating the wheel unit of the slidable luggage board assembly for a vehicle according to an exemplary embodiment of the present disclosure.

An exemplary embodiment of the wheel unit restoring component may include a tubular spring housing 61, a restoring spring 62 which is inserted into the spring housing 61, and a contactor 63 which is disposed at a front end of the restoring spring 62, as illustrated in FIG. 9. The spring housing 61 may be formed in a hollow tubular shape and coupled to one side of the floor panel 10. An end portion of the spring housing 61, may be opposite to a portion of the spring housing 61 coupled to the floor panel 10, and may be formed to be opened.

The restoring spring 62 may be inserted into the spring housing 61 and may provide an elastic force to return the wheel unit 30 back to the original state. For example, the restoring spring 62 may be formed in the form of a coil spring and inserted into the spring housing 61 when the restoring spring 62 is compressed, thereby allowing the wheel unit 30 to return back to the original state.

The contactor 63 may be disposed at the front end of the restoring spring 62, and the contactor 63 may be in contact with a side surface of the wheel support 32. The wheel unit 30 may return back to the original state when the restoring spring 62 is extended by elastic force, the contactor 63 applies a force to the wheel support 32, and the wheel support 32 may be rotated when the contactor 63 is in contact with the upper portion of the wheel support 32 (e.g., the upper portion of the rotating shaft).

The operation handle 40 may be disposed on the luggage board 20 to enable an occupant to operate the operation handle 40. The operation handle 40 may be rotatably disposed on the luggage board 20. Additionally, the operation handle 40 is installed at a handle bracket 22. When the occupant operates the operation handle 40, the operation handle 40 may be rotated to allow the wheel unit 30 to support the luggage board 20. The operation handle 40 may include an operating portion 41 which is operated by the occupant, a rotating potion 42 which is rotatably disposed on the luggage board 20, a link operating portion 43 which is rotated together with the rotating potion 42, and a cooperating lever 45 which is rotated in conjunction with the link operating portion 43.

The operating portion 41 may be formed in the form of a bar. The occupant may rotate the operation handle 40 using the operating portion 41. The rotating portion 42 may extend from one side of the operating portion 41 and may be coupled to the luggage board 20. The rotating portion 42 may be a portion that provides a rotating shaft of the operation handle 40, and the operating portion 41 may be rotated about the rotating portion 42 when the operating portion 41 is pulled. The rotating portion 42 may be disposed in the width direction (e.g, L direction) of the vehicle. Since the rotating portion 42 is formed in the width direction of the vehicle, the operation handle 40 may be operated more easily when the cargo area of the vehicle is opened.

The link operating portion 43 may extend from one side of the rotating portion 42. When the operating portion 41 is operated, the link operating portion 43 pulls the cable 50 that connects the operation handle 40 and the wheel unit 30. An extension portion 43*a*, which extends from the link operating portion 43, may be formed at an end portion of the link operating portion 43. The extension portion 43*a* may be provided with an inclined surface 43*b* formed at one side of the extension portion 43*a*. The extension portion 43*a* may be formed to be curved further inward than the link operating portion 43 and the cooperating lever 45 may be operated more easily. The inclined surface 43*b* may contact the cooperating lever 45 when the operation handle 40 is operated, thereby rotating one side of the cooperating lever 45.

A first end of the cooperating lever 45 may be rotatably disposed at the luggage board 20, and a second end of the cooperating lever 45 may be coupled to the cable 50 that connects the operation handle 40 and the wheel unit 30. The extension portion 43*a* of the link operating portion 43 may be disposed below the cooperating lever 45. The cooperating lever 45 may be in contact with the inclined surface 43*b* when the cooperating lever 45 is inclined. When the link operating portion 43 is rotated as the operation handle 40 is operated, the inclined surface 43*b* may be raised when the inclined surface 43*b* is inclinedly in contact with the cooperating lever 45. Accordingly, the cooperating lever 45 may be rotated in a lateral direction to pull the cable 50.

The operating portion 41, the rotating portion 42, and the link operating portion 43 may be integrally formed and disposed in the cavity formed in the luggage board 20. The rotating portion 42 and the link operating portion 43 may be disposed in the luggage board 20, and the operating portion 41 may be exposed so that the occupant may operate the operating portion 41.

The cable 50 may be coupled to the operation handle 40 and the wheel unit 30. When the occupant operates the operation handle 40, the cable 50 transmits operating force to the wheel unit 30 to rotate the wheel unit 30. The cable 50 may be provided in the form of a tube having a wire therein, the tube may be coupled to the luggage board 20, and both ends of the wire may be connected to the cooperating lever 45 and the wheel support 32, respectively, to rotate the wheel support 32 when the occupant operates the operation handle 40.

An operation of the slidable luggage board assembly for a vehicle according to the present disclosure, which is configured as described above, will be described. First, an occupant may open a tail gate of a vehicle, (e.g., a sport utility vehicle (SUV)) to load or unload an article into or out of a cargo area of the vehicle. To load or unload the article when the tail gate is opened, the luggage board 20 may slide toward a rear end of the vehicle. A lower end of the luggage board 20, for example, a lower end of the bent portion 20*a* of the luggage board 20 may be in contact with the floor panel 10 at all times, and as a result, the luggage board 20 does not slide easily.

In particular, the occupant operates the operation handle 40 to allow the retracted wheel unit 30 to stand up and allow the wheel 34 to support the rail 21. When the occupant operates the operation handle 40, that is, when the occupant pulls the operating portion 41 of the operation handle 40, the operation handle 40 may be rotated about the rotating portion 42. When the occupant holds and rotates the operating portion 41, the link operating portion 43 may also be rotated. When the link operating portion 43 is rotated, the inclined surface 43*b* may be rotated when the inclined surface 43*b* is in contact with an edge 45*a* of the cooperating lever 45 to rotate the cooperating lever 45 opposite to the link operating portion 43.

When the occupant holds and rotates the operating portion 41 as described above, the cooperating lever 45 may be rotated toward one side to pull the cable 50. When the cable 50 is pulled, the wheel unit 30, which is in the retracted state, may be disposed upright to be positioned perpendicular to the floor panel 10.

Figure 11A:
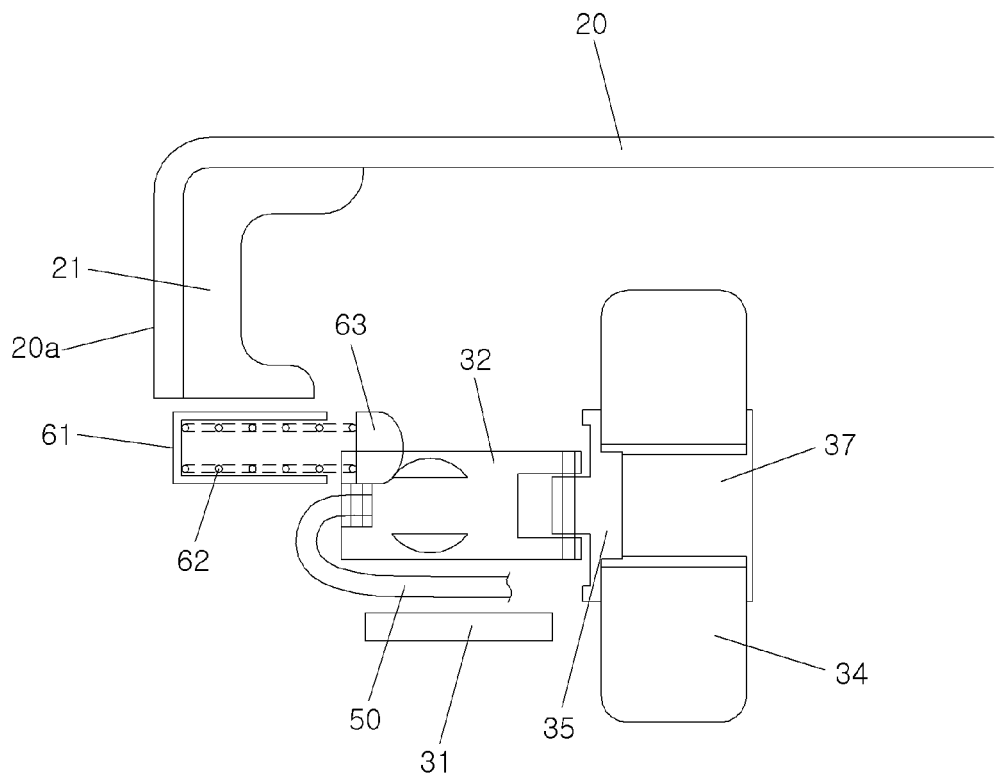
FIGS. 11A to 11C are exemplary cross-sectional views sequentially illustrating a state in which a wheel is operated when an operation handle is operated in the slidable luggage board assembly for a vehicle according to exemplary embodiments of the present disclosure.
Figure 11B:
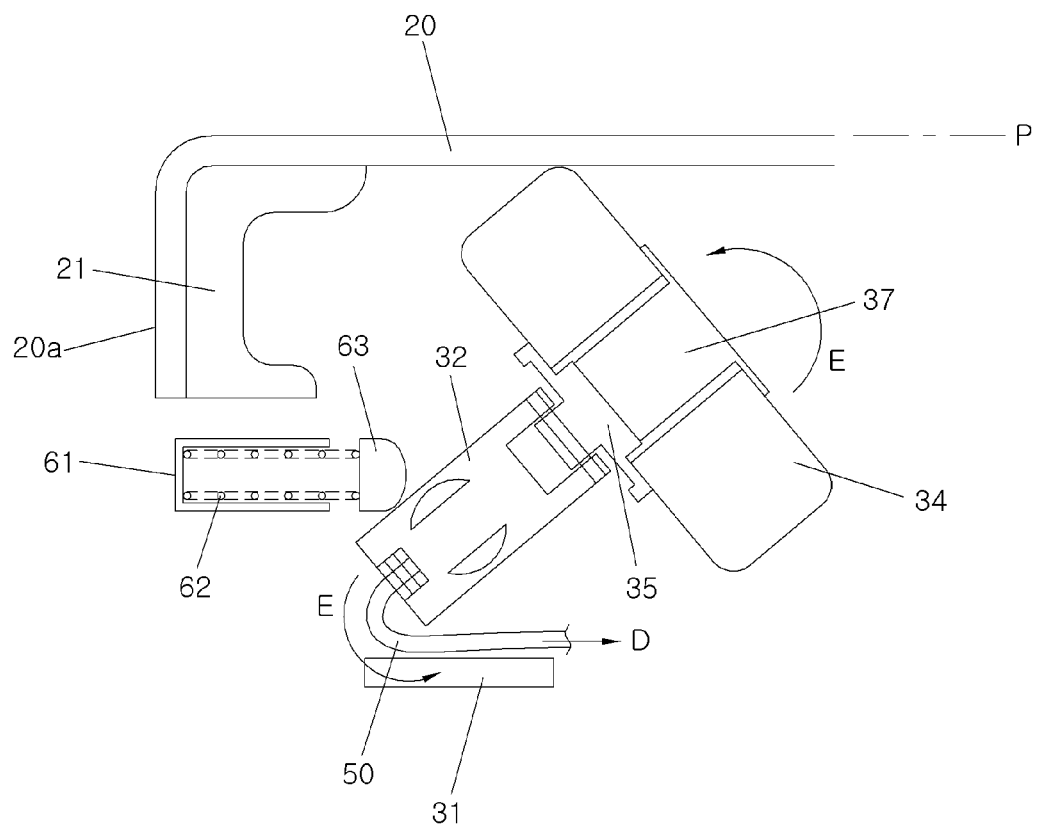
Figure 11C:
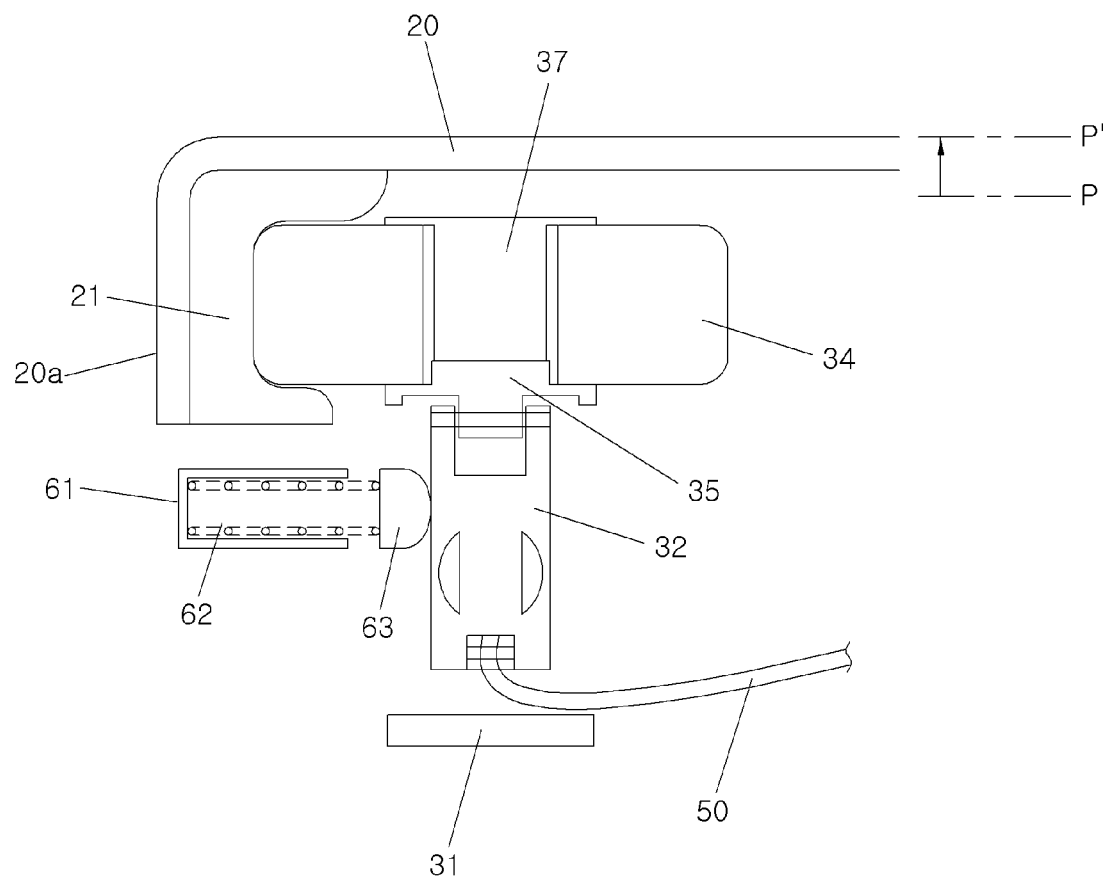
Figure 12:
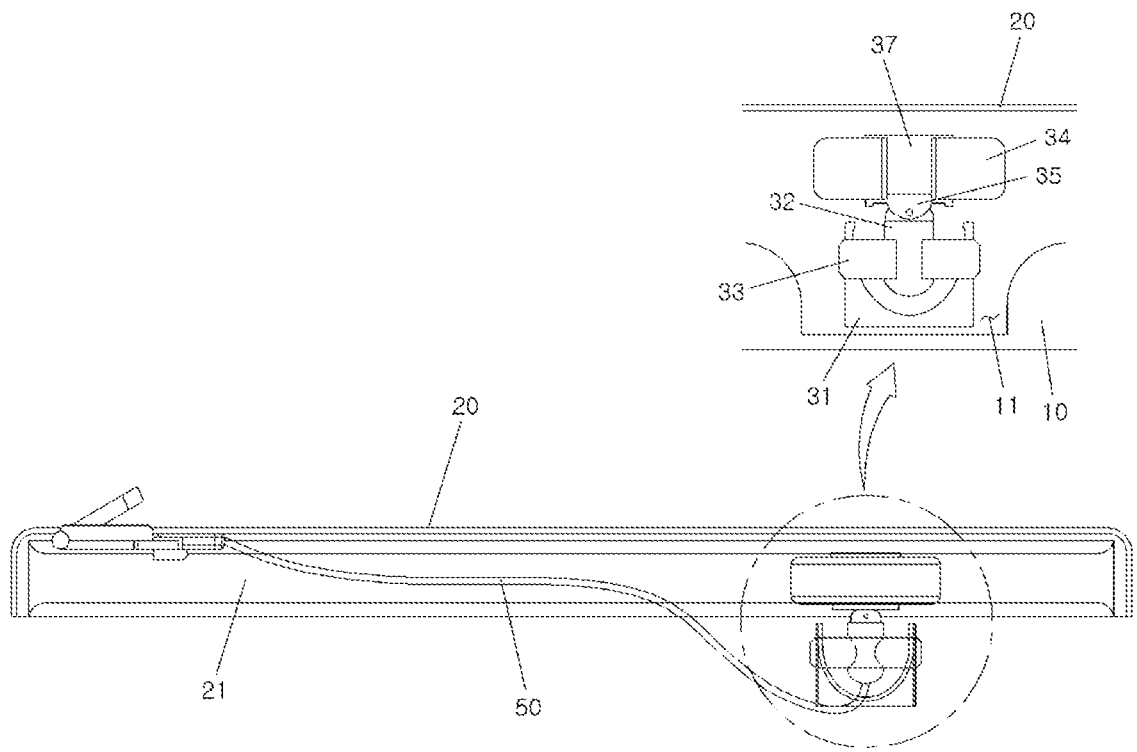
FIG. 12 is an exemplary cross-sectional view illustrating a state in which a luggage board is slid in the slidable luggage board assembly for a vehicle according to an exemplary embodiment of the present disclosure.
Figure 13A:
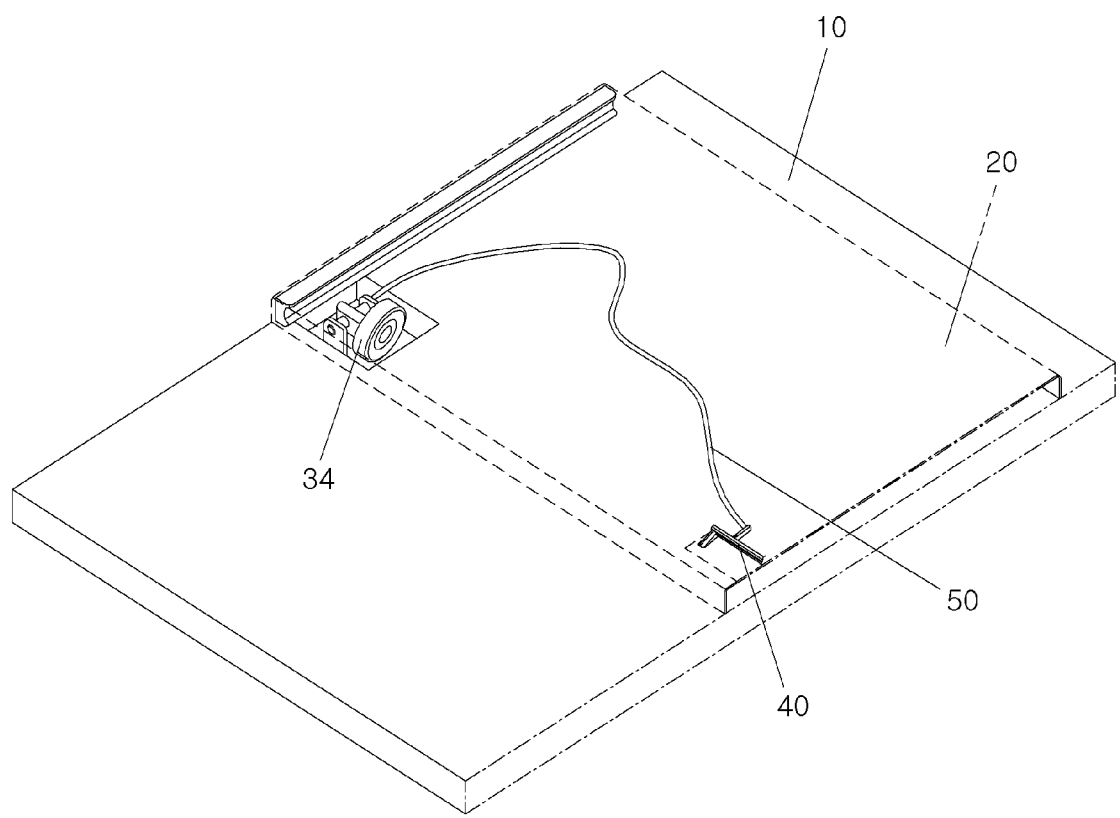
FIGS. 13A to 13C are exemplary perspective views illustrating a state in which the luggage board is slid in the slidable luggage board assembly for a vehicle according to exemplary embodiments of the present disclosure.
Figure 13B:
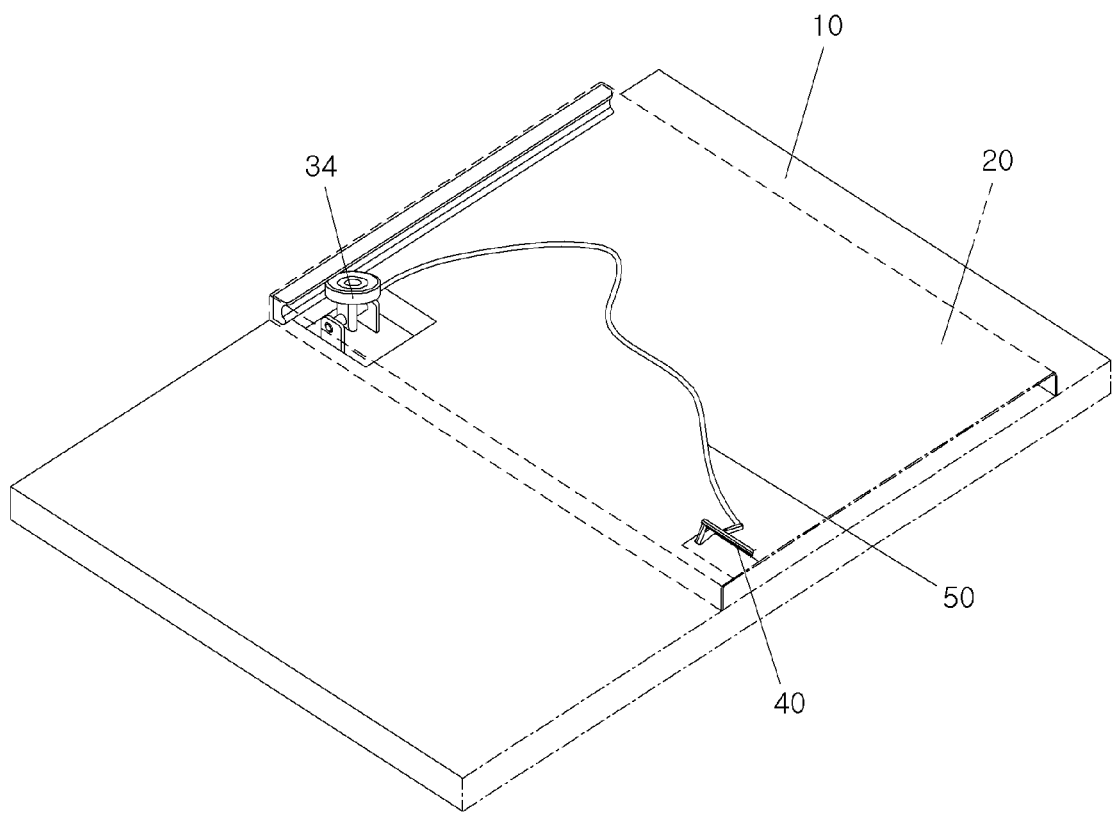
Figure 13C:
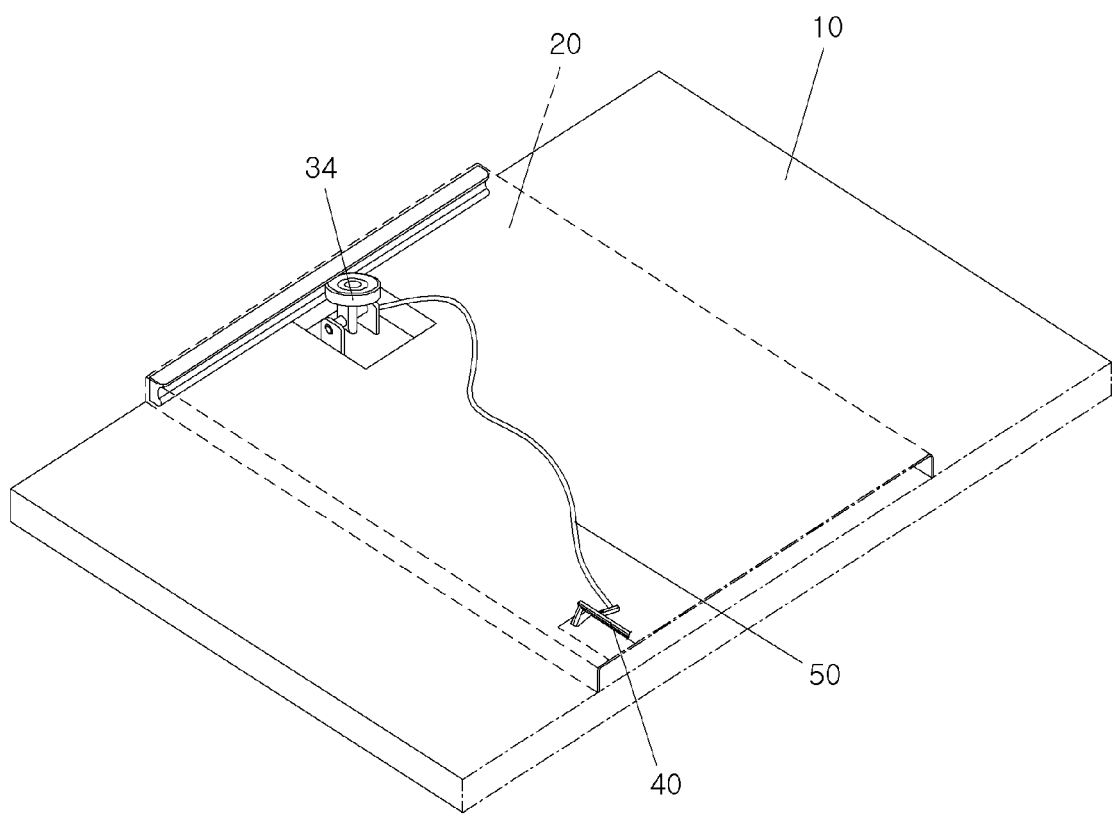
Figure 14:
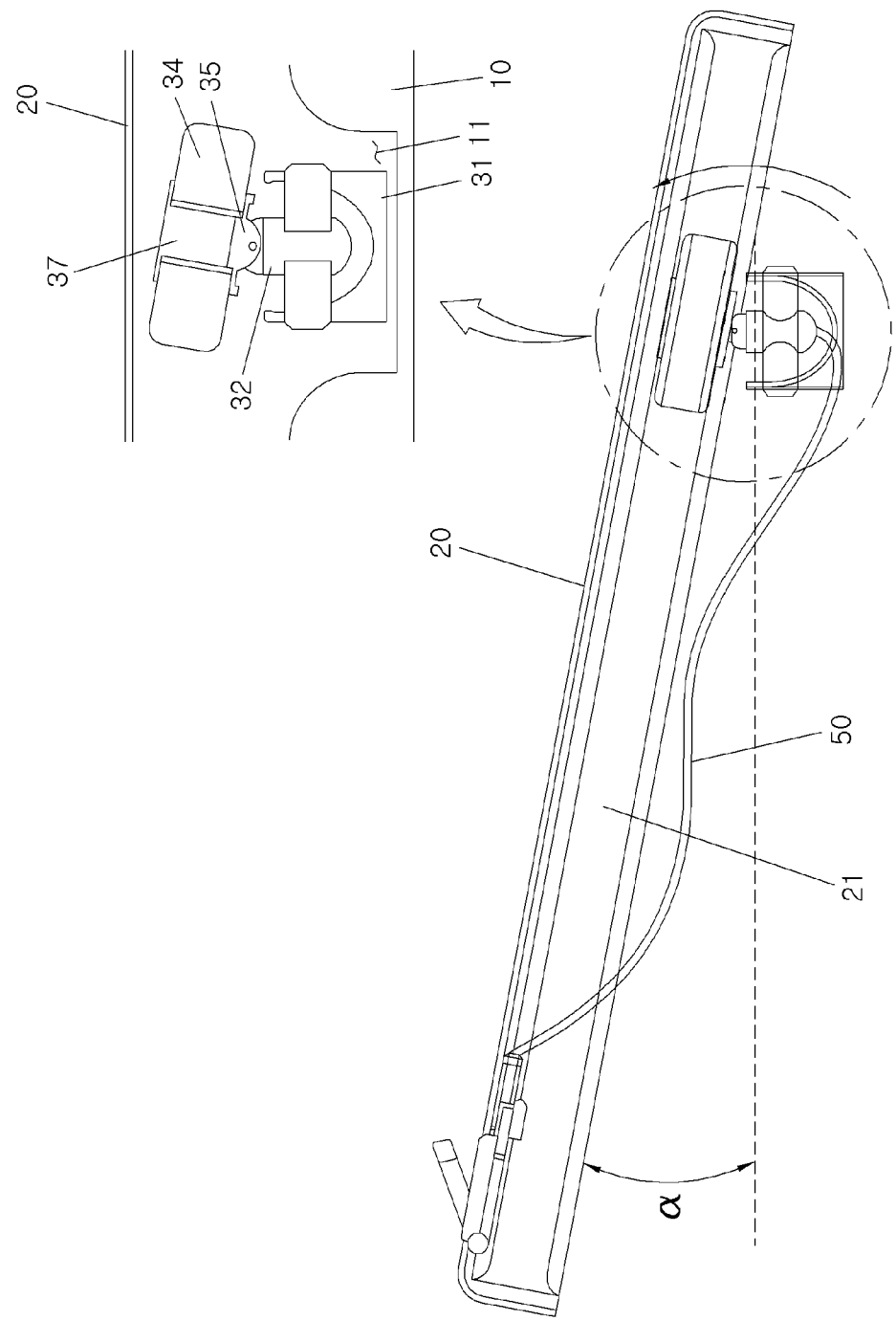
FIG. 14 is an exemplary cross-sectional view illustrating a state in which the luggage board is tilted in the slidable luggage board assembly for a vehicle according to an exemplary embodiment of the present disclosure.
Figure 15:
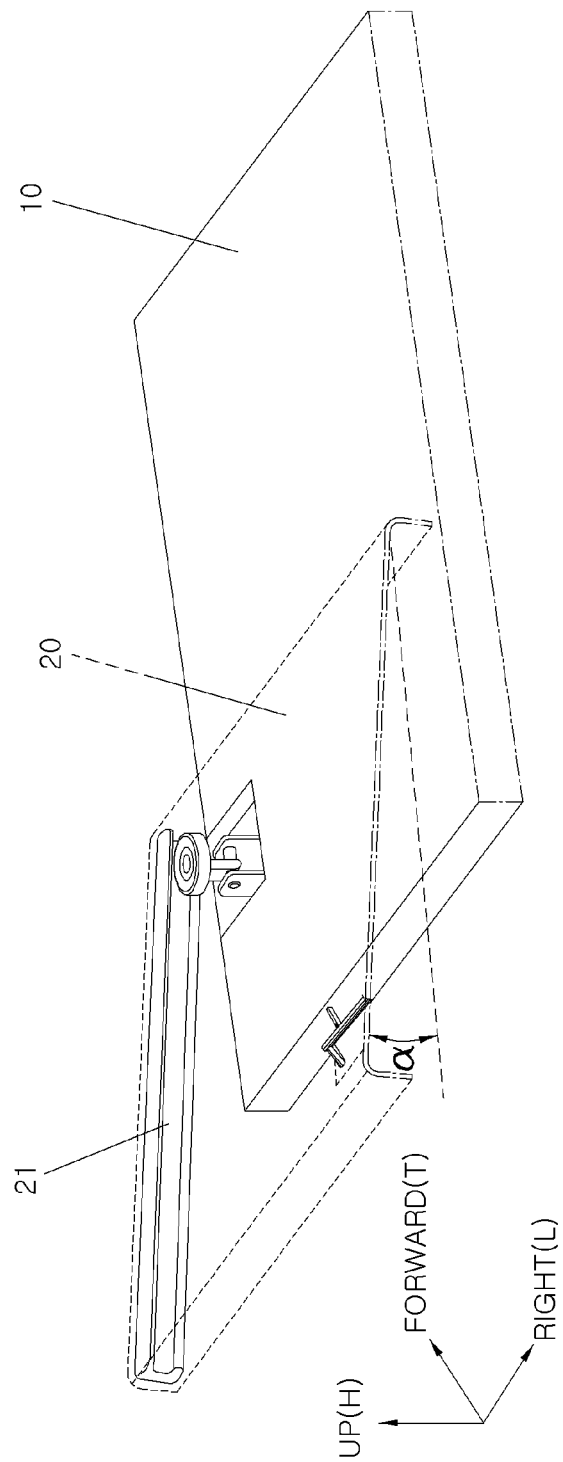
FIG. 15 is an exemplary perspective view illustrating a state in which the luggage board is tilted in the slidable luggage board assembly for a vehicle according to an exemplary embodiment of the present disclosure.

In other words, as illustrated in FIG. 11A, the wheel unit 30 may be in the retracted state and the wheel 34 may be separated from the rail 21 before the operation handle 40 is operated. In particular, when the operation handle 40 is operated, the cable 50 may be pulled in the arrow direction (D direction), and the wheel support 32 may be rotated about the rotating shaft 33 (see arrows E), as illustrated in FIG. 11B. In other words, the restoring spring 62 applies elastic force in the direction opposite to the direction in which the wheel support 32 may be rotated, but the operating force may be greater than the elastic force. Accordingly, the wheel support 32 may continue to be rotated in the direction of the arrow E so as to stand upright.

When the occupant operates the operation handle 40 to the maximum degree, the wheel support 32 may be perpendicular to the floor panel 10. When the wheel support 32 becomes perpendicular to the floor panel 10, the wheel 34 may be inserted into the rail 21. When the wheel 34 is inserted into the rail 21, the wheel 34 may contact a bottom surface of a cross section of the rail 21 and with a partial portion adjacent to the bottom surface of the rail 21.

Further, the wheel unit 30 may be configured to be displace the rail 21 in an upward direction when the wheel 34 is inserted into the rail 21. The rail 21 may be disposed at a position lower than a position of the rail 21 when the wheel 34 is parallel to the ground surface. When the wheel 34 is inserted into the rail 21 as described above, the rail 21 may be supported by the wheel unit 30 and partially displaced in an upward direction. When the wheel unit 30 is completely rotated, the luggage board 20 may be displaced in an upward direction from a previous position P to a new position P' by Δ(P'-P) (see FIG. 11C). The lower end of the bent portion 20a of the luggage board 20 may be spaced apart from the floor panel 10.

As the wheel 34 is inserted into the rail 21 and the luggage board 20 may be spaced apart from the floor panel 10 as described above, the occupant may extend the luggage board 20 more easily to a desired position. When the luggage board 20 is extended as described above, the occupant may load an article onto the upper surface of the luggage board 20 more easily.

When the occupant releases the operation handle 40 when the luggage board 20 is extended to a position desired by the occupant, the wheel unit 30 may return back to the original position. In other words, when the occupant releases the operation handle 40, the elastic force of the wheel unit restoring component is applied in a state in which no operating force is inputted through the cable 50. The restoring spring 62 may rotate the wheel support 32 to return the wheel unit 30 back to the retracted state.

Thereafter, to accommodate the luggage board 20 back to the original position, the occupant accommodates the luggage board 20 at a desired position after the operation handle 40 is operated. Accordingly, the wheel unit 30 in the retracted state, may be disposed to be perpendicular to the floor panel 10, the wheel 34 may be inserted into the rail 21, and the luggage board 20 may be spaced apart from the floor panel 10. When the operation handle 40 is released after the luggage board 20 is accommodated at the desired position, the luggage board 20 and the wheel unit 30 may be separated from each other again, and the lower end of the luggage board 20 may contact with the floor panel 10 and the luggage board 20 may be maintained in a stopped state.

Further, the slidable luggage board assembly for a vehicle according to the present disclosure may slide when the slidable luggage board assembly for a vehicle is tilted. When the occupant moves a rear end of the luggage board 20 in an upward direction at a predetermined angle α when the luggage board 20 is slidable, the lower fixing unit 35 and the wheel 34 may also be inclined about the fixing pin 36 at the same angle as the luggage board 20. The luggage board 20 may be extended or retracted in this inclined state. Accordingly, the occupant may slide the luggage board 20 in a comfortable posture. In the related art, the luggage board of the luggage board assembly is fixed at a plurality of points in the longitudinal direction of the vehicle. However, in the luggage board assembly according to the present disclosure, the luggage board 20 may be supported by the wheel unit 30 at a single point in the longitudinal direction (e.g., T direction) of the vehicle, and the lower fixing unit 35 of the wheel unit 30 may be rotated about the fixing pin 36. Therefore, the luggage board 20 may be extended or retracted when the luggage board 20 is tilted by the predetermined angle α.

According to the slidable luggage board assembly for a vehicle according to the present disclosure which is configured as described above, the rail is not disposed on the floor panel, and the wheel is covered by the luggage board. Additionally, there is no component exposed to the outside, thereby improving an aesthetic appearance. In particular, the space for installing the wheel unit needs to be formed in the floor panel, and a space for installing the rail is not required, thereby increasing a loading cavity. Further, the luggage board may slide when the luggage board is tilted, and as a result, an article is more easily loaded or unloaded.

Although the present disclosure has been shown and described with respect to exemplary embodiments, it will be obvious to those skilled in the art that the present disclosure may be variously modified and altered without departing from the spirit and scope of the present disclosure as defined by the following claims.

What is claimed is:

1. A slidable luggage board assembly for a vehicle, comprising:
   a luggage board disposed above a floor panel of a cargo area of a vehicle and has an upper surface onto which an article is loaded;
   a wheel unit disposed on the floor panel and has a wheel that comes into contact with an inner surface of the luggage board when the luggage board is slid;
   an operation handle disposed at one side of the luggage board and configured to receive an operating force; and
   a cable having a first end connected to the wheel unit and a second end connected to the operation handle and configured to transmit the operating force applied to the operation handle, to the wheel unit,
   wherein bent portions, which are bent in a downward direction, are formed at both ends of the luggage board.

2. The slidable luggage board assembly of claim 1, wherein the bent portion is formed in a longitudinal direction of the vehicle, a rail has a concave cross section and contacts the wheel when the wheel unit is operated, is installed in the bent portion, and the wheel is inserted into the rail when the operation handle is operated, and is configured to guide the sliding movement of the luggage board.

3. The slidable luggage board assembly of claim 2, wherein the wheel unit includes:

a wheel bracket which coupled within a concavely formed accommodating groove disposed in the floor panel;

a wheel support which is rotatably disposed in the wheel bracket and has a lower end connected to an end portion of the cable; and a wheel which is rotatably disposed at an upper end of the wheel support, and the upper end of the wheel support is rotated proximate to the rail and the wheel is inserted into the rail when operating force is transmitted to the lower end of the wheel support through the cable.

4. The slidable luggage board assembly of claim 3, wherein the wheel is disposed to displace the rail in an upward direction by a predetermined height when the wheel is rotated and inserted into the rail.

5. The slidable luggage board assembly of claim 4, wherein a rotating shaft is disposed to penetrate the wheel bracket and the wheel support, the rotating shaft is disposed in the longitudinal direction of the vehicle, and the wheel is configured to rotate in a width direction of the vehicle and inserted into the rail.

6. The slidable luggage board assembly of claim 5, wherein a lower fixing unit, that supports a lower end of the wheel and is coupled to the wheel support, is disposed between the upper end of the wheel support and the wheel.

7. The slidable luggage board assembly of claim 6, wherein an accommodation cavity for accommodating the lower fixing unit is formed at the upper end of the wheel support, and a lower portion of the lower fixing unit is disposed in the accommodation cavity.

8. The slidable luggage board assembly of claim 7, wherein the lower fixing unit is formed in the form of a disc and has an insertion portion that protrudes in a downward direction from a bottom surface of the lower fixing unit, and the insertion portion is disposed in the accommodation cavity.

9. The slidable luggage board assembly of claim 8, wherein a fixing pin is disposed to penetrate an upper portion of the wheel support and the insertion portion, and the fixing pin is disposed in the width direction of the vehicle.

10. The slidable luggage board assembly of claim 9, wherein a side surface of the insertion portion is a flat surface which is in surface-to-surface contact with a side surface of the wheel support in the accommodation cavity.

11. The slidable luggage board assembly of claim 6, wherein an upper cap is disposed to penetrate the wheel, and a lower end of the upper cap is coupled to the lower fixing unit.

12. The slidable luggage board assembly of claim 2, wherein the rails are disposed at both ends of the luggage board, and the wheel units are disposed at both ends of the floor panel, respectively.

13. The slidable luggage board assembly of claim 1, wherein the operation handle includes:
an operating portion which is exposed from the upper surface of the luggage board;
a rotating potion which is integrally formed with the operating portion and rotatably disposed in the luggage board;
a link operating portion which extends from an end portion of the rotating potion; and
a cooperating lever which has a first end that is rotatably disposed on the luggage board and configured to rotate by coming into contact with the link operating portion when the link operating portion is rotated, and a second end that is connected to the cable.

14. The slidable luggage board assembly of claim 13, wherein the operating portion, the rotating potion, and the link operating portion are integrally formed.

15. The slidable luggage board assembly of claim 13, wherein an extension portion, which extends from the link operating portion toward the cooperating lever, is formed at a front end of the link operating portion, and an inclined surface, which is inclinedly in contact with an edge of the cooperating lever below the cooperating lever, is formed at the front end of the link operating portion.

16. The slidable luggage board assembly of claim 3, wherein a wheel unit restoring component allows the wheel unit, which is rotated by the cable to return to an original position, is disposed in the floor panel.

17. The slidable luggage board assembly of claim 16, wherein the wheel unit restoring component includes:
a spring housing coupled to the floor panel and formed in a tubular shape;
a restoring spring which is inserted into the spring housing and elastically supports the wheel unit; and
a contactor which is disposed at a front end of the restoring spring and contacts a side surface of the wheel support.

* * * * *